United States Patent [19]
Morita

[11] Patent Number: 5,313,024
[45] Date of Patent: May 17, 1994

[54] COORDINATE READING SYSTEM
[75] Inventor: Yoshiyuki Morita, Koto, Japan
[73] Assignee: Seiko Instruments Inc., Japan
[21] Appl. No.: 869,431
[22] Filed: Apr. 15, 1992
[30] Foreign Application Priority Data Apr. 26, 1991 [JP] Japan .................................. 3-97597
Apr. 26, 1991 [JP] Japan .................................. 3-97599
Jun. 7, 1991 [JP] Japan .................................. 3-136855

[51] Int. Cl.$^5$ .......................................... G08C 21/00
[52] U.S. Cl. ........................................ 178/19; 178/20
[58] Field of Search .............................. 178/18, 19, 20

[56] References Cited
U.S. PATENT DOCUMENTS 4,029,899  6/1977  Gordon ............................. 178/19
4,686,331  8/1987  Burgess ............................. 178/19
4,952,757  8/1990  Purcell et al. ..................... 178/19

FOREIGN PATENT DOCUMENTS 0326396  8/1989  European Pat. Off.
0399906  11/1990  European Pat. Off.

Primary Examiner—Curtis Kuntz
Assistant Examiner—Paul Loomis
Attorney, Agent, or Firm—Bruce L. Adams; Van C. Wilks

[57] ABSTRACT

A coordinate reading system that allows the determination of coordinate values without scanning has a simplified tablet structure and increased coordinate calculation speed. A coordinate indicator contains a coil and generates an AC magnetic field by excitation signals received from an excitation signal generating circuit. Sense lines having unequal width (zigzag sense lines) and/or rectangular return sense lines are laid in the tablet to induce signals having amplitudes that correspond to positions of the coil on the tablet when the AC magnetic field is generated. A selecting circuit directs the induced signals sequentially to a signal processing circuit. The signal processing circuit generates envelope signals of the induced signals. A calculating circuit calculates the coordinate values from the envelope signals generated by the signal processing circuit.

11 Claims, 14 Drawing Sheets

COORDINATE DETECTING DIRECTION

COORDINATE DETECTING DIRECTION

COORDINATE DETECTING DIRECTION

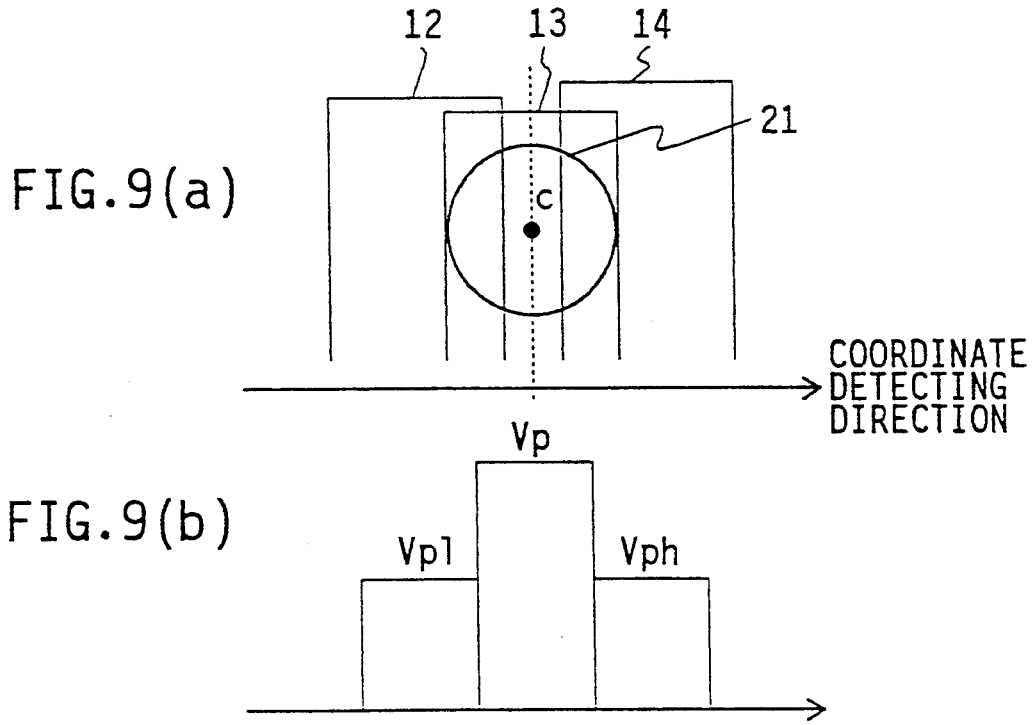
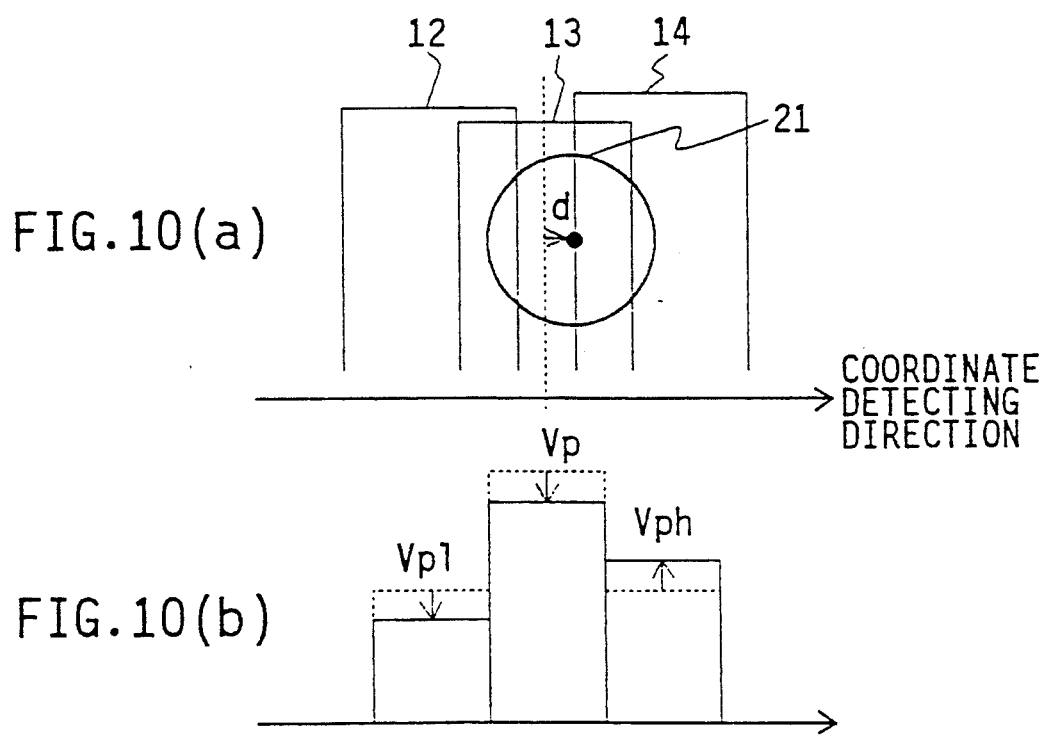

COORDINATE READING SYSTEM

BACKGROUND OF THE INVENTION

The present invention relates to a coordinate reading system for inputting a coordinate to an external device such as a computer.

As prior art coordinate reading systems, there exist Japanese Patent Laid-open No. 52/96825 and Japanese Patent Laid-open No. 55-96411, which were developed by the applicant of the present invention. Description will be made briefly about these coordinate reading systems.

FIG. 18 is a diagram illustrating a structure of the prior art coordinate reading system. A plurality of loop-shaped loop line groups 102 are laid on a tablet 101, a coordinate reading plate. These loop line groups 102 are selected one by one by a scanning circuit 107. An output s102 of the scanning circuit 107 is connected to a signal processing circuit 108 whose output is connected to a control circuit 109. The control circuit 109 also provides scanning signals s108 for selecting the loop line groups 102 sequentially in the scanning circuit 107.

A coil 113 is contained in a coordinate indicator 112 and is connected to an excitation signal generating circuit 111 contained in the main body of the coordinate reading system by an excitation signal cable 103.

In the coordinate reading system constructed as described above, coordinate values are calculated as follows. The coordinate indicator 112 is placed on the loop line groups 102 and always generates an AC magnetic field from the signal received from the excitation signal generating circuit 111. The control circuit 109 generates the scanning signal s108 and sequentially selects the scanning circuit 107. This operation is called "scanning." Since signals that correspond to a position where the coordinate indicator 112 is placed are induced in the loop line groups 102, the induced signal s102 for each loop line is sequentially inputted to the signal processing circuit 108 by selecting the loop line group 102 via the scanning circuit 107. The signal processing circuit 108 generates envelope waveforms of these induction signals. The control circuit 109 finds the coordinate values by inputting an amplitude of the induced signal for each loop line from this envelope waveform and by comparing and computing the amplitudes.

Accordingly, the prior art coordinate reading system is characterized in that it observes induced signals by scanning a large number of loop line groups.

In the prior art coordinate reading system, however, a large number of electronic switches such as analog switches had to be used for the scanning circuit to scan the whole tablet surface. This has been a factor which causes an increase in the cost. Moreover, there has been a problem that many loop lines have to be switched in order to detect the induced signals and the speed for detecting the position cannot be increased.

SUMMARY OF THE INVENTION

Accordingly it is an object of the present invention to solve the aforementioned problems of the prior art coordinate reading system by realizing a coordinate reading system that allows calculation of coordinate values without scanning.

It is another object of the present invention to lower the cost of the coordinate reading system and of the tablet in particular, and to increase the speed for detecting the position.

In order to achieve the aforementioned goals, according to a first embodiment of the invention, the coordinate reading system is comprised of a tablet on which a first sense line and a second sense line are laid so that their respective widths gradually increase and decrease along the coordinate detecting direction, and a coordinate indicator to calculate a position on which the coordinate indicator is placed based on induced signals induced on the first and second sense lines due to electromagnetic coupling between the first and second sense lines.

According to a second embodiment of the invention, the coordinate reading system is comprised of a tablet on which m rectangular return sense line groups of conductor lines laid in parallel in an equal interval in the coordinate detecting direction and returned and connected in a rectangular shape are laid with a gap of 2 n/m ($0 \leq n < m$) of said interval of said conductor line group that composes one rectangular return sense line, and a coordinate indicator, to calculate a position of the coordinate indicator based on induced signals induced in the rectangular return sense line groups due to electromagnetic couplings between the rectangular return sense line groups and the coordinate indicator.

According to a third embodiment of the invention, the coordinate reading system is comprised of a tablet on which the sense line group in the first embodiment and the sense line group in the second embodiment are laid, and a coordinate indicator, to calculate a position of the coordinate indicator based on induced signals induced in the sense line groups due to electromagnetic coupling between the sense line groups and the coordinate indicator.

In the coordinate reading system of the first embodiment, signals are induced in the sense lines due to electromagnetic coupling between the coordinate indicator and the sense lines laid on the tablet. Since the width of the sense lines re increased or decreased along the coordinate detecting direction, magnitudes of the induced signals increase or decrease depending on the position of the coordinate indicator along the coordinate detecting direction. Specifically, since the increase or decrease inclinations of the loop width of the first and second sense lines oppose each other, magnitudes of the induced signals that correspond to the position of the coordinate indicator may be obtained in each of the first and second sense lines. This coordinate reading system allows calculation of the position in a wide range in the coordinate detecting direction from the magnitudes of the induced voltages obtained from these two sense lines.

In the coordinate reading system of the second embodiment, signals are induced in the rectangular return sense line groups due to electromagnetic coupling between the coordinate indicator and the rectangular return sense line groups. Although a position with respect to the whole tablet surface cannot be obtained from the sense line groups since they cover the whole tablet surface by repetitive patterns, the sense line groups are laid with a slight gap one, by one and different induced signals are observed in each sense line, so that the position of the coordinate indicator may be accurately determined by calculating amplitudes of induced signals of each sense line.

The coordinate reading system according to the third embodiment allows calculation of the position in a wide range in the coordinate detecting direction from the induced signals induced in the first and second sense lines and calculation of the position accurately from the rectangular return sense line groups, so that the position may be calculated finely in a wide range in the coordinate detecting direction.

BRIEF DESCRIPTION OF THE DRAWINGS

FIGS. 9, 10, 11 are diagrams explaining correspondences between positions of the coil (FIGS. 9(a), 10(a) and 11(a)) and distribution of induced signals for calculating the Q value (FIGS. 9(b), 10(b) and 11(b)) in the second embodiment;

DETAILED DESCRIPTION OF THE PREFERRED EMBODIMENTS

Figure 2:
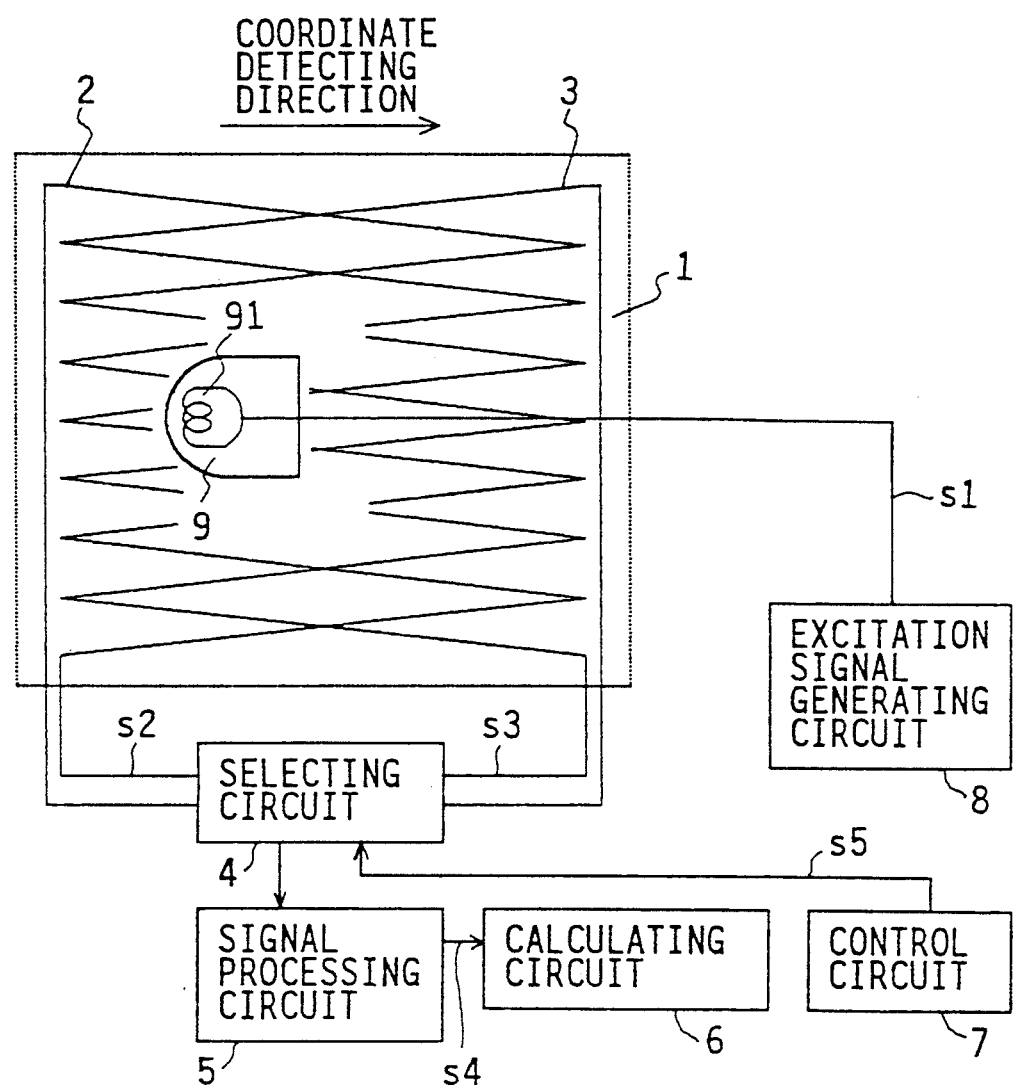
FIG. 2 is a diagram illustrating a structure of a first embodiment of the coordinate reading system according to the present invention.
Figure 3:
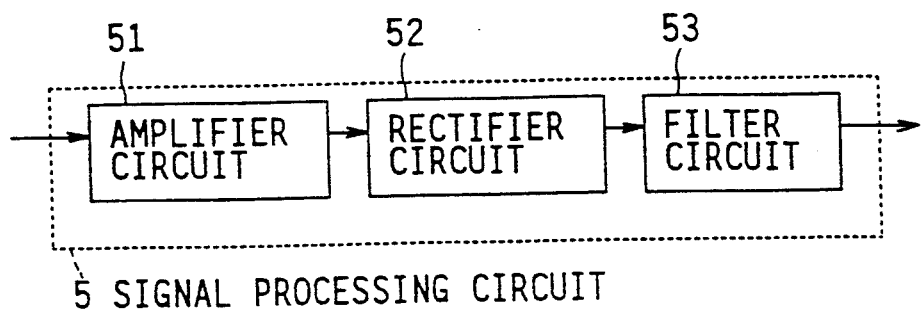
FIG. 3 is a diagram illustrating a structure of a signal processing circuit of the coordinate reading system according to the present invention.

Referring now to FIGS. 2, 3 and 4, a first embodiment of the present invention will be explained.

FIG. 2 is a diagram illustrating a structure of a coordinate reading system according to the first embodiment. To simplify its explanation, description will be made on a one-dimensional coordinate reading system.

In FIG. 2, a coordinate indicator 9 contains a coil 91 which is connected to an excitation signal generating circuit 8. The excitation signal generating circuit 8 supplies excitation signals s1 to the coil 91. The excitation signal s1 is an AC signal of about 614.4 kHz, for example. However, this signal is not limited to that frequency but may be any signal so long as it basically generates an electromagnetic coupling action between the coil 91 and sense lines described later.

A first zigzag sense line 2 and a second zigzag sense line 3 are laid along the coordinate detecting direction on a tablet 1. The first zigzag sense line 2 is formed from a plurality of sense lines laid in a manner so that their width gradually decreases along the coordinate detecting direction. The individual sense lines are sequentially disposed in the direction perpendicular to the coordinate detecting direction and are connected in series into one zigzag sense line.

The second zigzag sense line 3 is the mirror image of the width of the first zigzag sense line 2 and is structured in the same manner as the first zigzag sense line 2. It is laid by increasing the width of the sense lines along the coordinate detecting direction. Induced signals s2 and s3 are induced in their corresponding zigzag sense lines due to an AC magnetic field generated by the coil 91 in the coordinate indicator 9.

The first zigzag sense line 2 and the second zigzag sense line 3 are connected to a selecting circuit 4. The selecting circuit 4 comprises electronic switching elements such as analog switches and connects either one of the first zigzag sense line 2 or the second zigzag sense line 3 to a signal processing circuit 5.

The signal processing circuit 5 inputs the induced signals s2 and s3 induced in the zigzag sense lines and generates their envelope signal s4. FIG. 3 is a diagram showing one example of a structure of the signal processing circuit 5, which comprises an amplifier circuit 51, a rectifier circuit 52 and a filter circuit 53. The signal processing circuit 5 output is connected to a calculating circuit 6.

The calculating circuit 6 inputs the envelope signal s4 of the induced signals s2 and s3 and calculates coordinate values. An input section for inputting the envelope signal s4 comprises an A/D converter for reading a voltage value of the envelope signal s4 as a digital value. A control circuit 7 controls operations of the system and is connected to the selecting circuit 4 to supply a selecting signal s5.

Now before, explaining the operations of the system structured as described above, a relationship between a position of the coordinate indicator 9 and induced signals will be explained exemplifying the induced signal s2 induced in the first zigzag sense line 2.

Figure 4A:
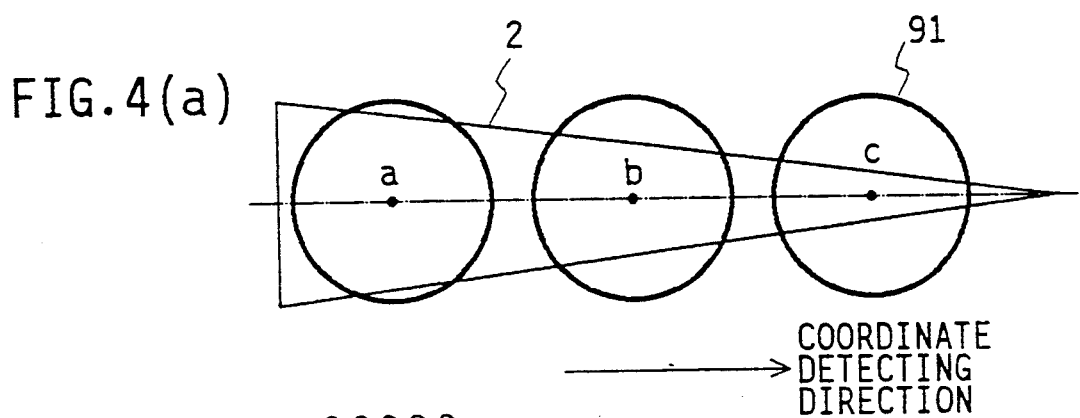
FIG. 4 is a diagram explaining correspondences between positions of a coil on a zigzag sense line (FIG. 4(a)) and induced signals (FIG. 4(b)) in the first embodiment.
Figure 4B:
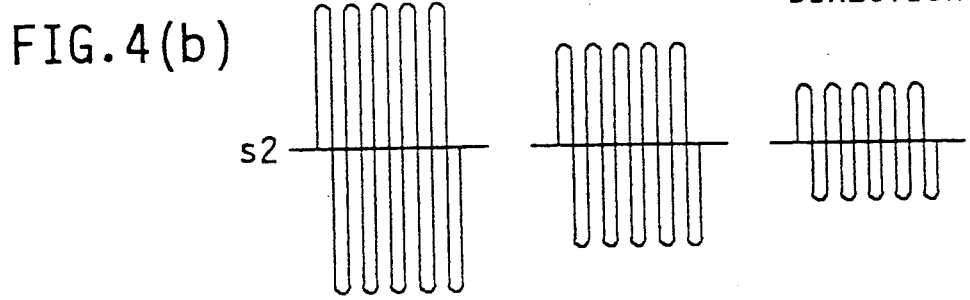

As shown in FIG. 4a, when the coil 91 is placed at a point a in the figure in the area where the width of the first zigzag sense line 2 is wide, a relatively large number of magnetic flux lines generated by the coil 91 penetrate through within a loop structured by the zigzag sense line and as a consequence, an amplitude of the induced signal s2 induced in the zigzag sense line becomes large, as shown in FIG. 4(b). Then, as the coil 91 moves along the coordinate detecting direction, the amplitude of the induced signal s2 becomes smaller, as shown in FIG. 4(b).

Accordingly, the amplitudes of the induced signal s2 contain information relating to the position where the coil 91 is placed. Utilizing these characteristics, the coordinate reading system of the present invention determines coordinate values from the amplitudes of the induced signals.

However, the amplitude of the induced signal induced in the zigzag sense line is not fluctuated only with the position as mentioned above. It is evident that it largely fluctuates also with height and it is necessary to eliminate fluctuations caused by a change in height when calculating coordinate values. To this end, two zigzag sense lines are provided to find coordinate values in which the fluctuation due to height is eliminated by calculating induced signals induced in two zigzag sense lines.

It is also evident that the amplitude of the induced signal is fluctuated when the coil 91 is moved in the direction perpendicular to the coordinate detecting direction if only one sense line element was provided without forming the zigzag sense lines shown in FIG. 2. A plurality of sense lines are thus connected in the direction perpendicular to the coordinate detecting direction for the purpose of eliminating the influence of movement in the direction perpendicular to the coordinate detecting direction. This is necessary when a two-dimensional coordinate reading system is structured.

Next, the operation of the aforementioned system will be explained.

The excitation signal generating circuit 8 always supplies the excitation signal s1 to the coil 91 in the coordinate indicator 9 and thereby the coil 91 always generates an AC magnetic field. The control circuit 7 first gives the selecting signal s5 to the selecting circuit 4 to connect the first zigzag sense line 2 to the signal processing circuit 5.

When the coordinate indicator 9 is placed on the tablet 1, the induced signal s2 which fluctuates depending on a position relationship with the coordinate indicator 9 is induced in the first zigzag sense line 2, so that the induced signal s2 is inputted to the signal processing circuit 5 after passing through the selecting circuit 4. The induced signal s2 is then amplified, rectified and converted into the envelope signal s4 by the signal processing circuit 5.

The calculating circuit 6 inputs the envelope signal s4. The input circuit of the calculating circuit 6 comprises the A/D converter as described before and the magnitude of the envelope signal s4 is read by digital value. The voltage value read is memorized.

Then the control circuit 7 gives the selecting signal s5 to the selecting circuit 4 to connect the second zigzag sense line 3 to the signal processing circuit 5.

The induced signal s3 induced in the second zigzag sense line 3 is converted into the envelope signal s4 in the same manner as described above and its voltage value is read by the calculating circuit 6.

Coordinate values are determined by the calculating circuit 6 as follows. At first, voltages of each induced signal are named as follows:

V1—amplitude voltage of the induced signal s2 of the first zigzag sense line 2, and V2—amplitude voltage of the induced signal s3 of the zigzag sense line 3.

From those voltage values, a coordinate value 'cood' is found by the next expression:

$$cood = V2 - V1 + C \qquad (1)$$

where C is a constant which is an offset value for defining an origin of the coordinate. In FIG. 2, when the coil 91 is placed in the opposite direction from the coordinate detecting direction, i.e. in the left area, since V2<V1, the value of V2−V1 becomes minus. Therefore, if C is selected so that the calculation result becomes positive when the coil 91 is placed at the left end and a coordinate value is added, 'cood' turns out to be a positive value. Generally the left end of a position detecting area is selected to be an origin so that coordinate values always turn out to be positive values, though the position of the origin may be changed in accordance with a user's need.

Experiments showed that the found 'cood' value corresponds to the position of the coil 91 almost linearly. It was also found that the influence of height could be eliminated by taking the difference between the two induced signals.

Now brief description will be made on some variations of the present embodiment.

Although the first and second zigzag sense lines are selected by the selecting circuit 4 for direction to the signal processing circuit 5, two signal processing circuits 5 may be provided for connection to the first zigzag sense line 2 and the second zigzag sense line 3, respectively. In such a case, the selecting circuit 4 and the control circuit 7 for controlling the selecting circuit become unnecessary, and outputs of the two signal processing circuits are connected to the calculating circuit 6.

By structuring like this, the calculating circuit 6 can input amplitudes of two sets of induced signals at the same time, so that the processing speed is further increased as compare to the aforementioned embodiment.

Moreover, although the aforementioned embodiment was described for a one-dimensional coordinate reading system, a two-dimensional coordinate reading system may be readily structured by providing and orthogonally disposing two sets of one-dimensional coordinate reading systems structured as described above.

Furthermore, when a movement in the direction perpendicular to the coordinate detecting direction can be controlled by other means in the one-dimensional coordinate reading system, the plurality of sense lines need not be provided as shown in the aforementioned embodiment. At this time, the tablet may be structured more simply. Moreover, when there is no movement in the height direction, two sense lines whose increase and decrease inclination of the width are opposed need not be combined, thereby allowing the structure to be even further simplified.

Although the lines composing the zigzag sense lines are drawn as straight lines in FIG. 2 in the aforementioned embodiment, they may be composed of appropriate curved lines. Error of coordinate values in the coordinate detecting direction may be compensated for by structuring the lines as curved lines. When it is further developed, a coordinate reading system that allows calculation of coordinates by a desired function characteristic may be realized.

A gist of the present invention is to characterize in the shape of the sense lines that compose the tablet and to find coordinate values by calculating induced signals induced in the sense lines.

Although the excitation signal generating circuit 8 is connected to the coil 91 in the coordinate indicator 9 to supply the excitation signal and to generate the AC magnetic field in the aforementioned embodiment, this structure is not an essential part of the present invention. Various coordinate reading system utilizing electromagnetic coupling between the tablet 1 and the coordinate indicator 9 have been proposed and the technology connected to the coupling principle may be applied to the present invention.

For example, there exists a system in which an excitation means is provided in a tablet and an AC magnetic field generated from it is coupled with a detecting means of the tablet through an intermediary of a coordinate indicator. There also exists a system in which induced signals caused by an AC magnetic field generated from an excitation means of a tablet is stored in a coordinate indicator, and then AC magnetic field is generated again from the coordinate indicator utilizing its energy. These are wireless coordinate reading systems in which the coordinate indicator need not be connected with the tablet by a signal cable, and the sense line structure for inducing induced signals may be structured in these coordinate reading systems in the same manner as the aforementioned embodiment.

Figure 5:
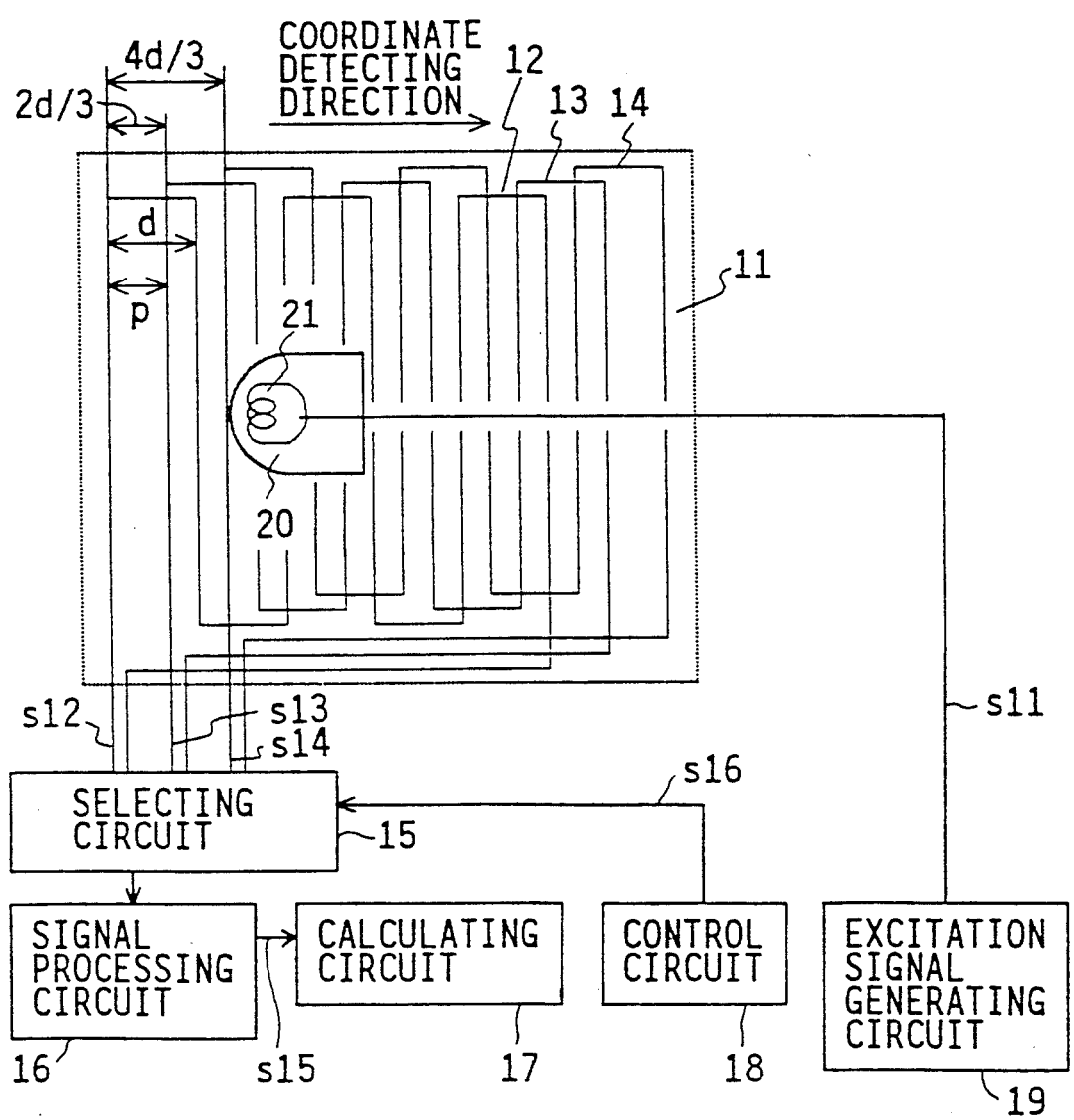
FIG. 5 is a diagram illustrating a structure of a second embodiment of the coordinate reading system according to the present invention.

Referring now to FIGS. 5 to 13, a second embodiment of the present invention will be explained. FIG. 5 is a diagram illustrating a structure of a coordinate reading system according to the second embodiment. To simplify its explanation, description will be made on a one-dimensional coordinate reading system.

In FIG. 5, a coordinate indicator 20, a coil 21, an excitation signal generating circuit 19 and a signal processing circuit 16 are provided in the same manner as the first embodiment.

Three sense lines are laid on a tablet 11 in this embodiment. That is, the three sense lines are a first rectangular return sense line 12, a second rectangular return sense line 13 and a third rectangular return sense line 14. Each sense line has the same construction: one sense line is comprised of a plurality of conductor lines which are laid in parallel with an interval d between the conductor lines, which are laid in the direction perpendicular to the coordinate detecting direction and whose ends are turned in rectangular shape and are connected. Those three sense lines are laid by setting one reference sense line and by creating gaps between sense lines of $\frac{2}{3}$ of the interval d and 4/3 of the interval d for the remaining two lines, as shown in FIG. 5. For the convenience of the explanation below, the gaps between neighboring two sense lines shall be referred to as a sense line pitch and expressed by p. In this connection, the present embodiment has a relationship of p=2d/3.

In these sense lines, induced signals s12, s13 and s14 are induced respectively due to the AC magnetic field generated by the coil 21 in the coordinate indicator 20.

The sense line groups are connected to the selecting circuit 15. The selecting circuit 15 comprises electronic switching elements such as analog switches and connects one of the first, second or third rectangular sense lines (12, 13 or 14) to the signal processing circuit 16.

The signal processing circuit 16 inputs the induced signals s12, s13 and s14 induced in each sense line and generates their envelope signal s15.

Output of the signal processing circuit 16 is connected to the calculating circuit 17. The calculating circuit 17 inputs the envelope signal s15 and calculates coordinate values. An input section of the calculating circuit 17 for inputting the envelope signal s15 is composed of an A/D converter for reading a voltage value of the envelope signal s15 as a digital value.

A control circuit 18 controls operations of the system and is connected to the selecting circuit 15 to supply a selecting signal s16.

Next, before explaining the operations, a relationship between positions of the coordinate indicator 20 and amplitudes of induced signals induced on one sense line will be explained exemplifying the induced signal s12 induced in the first rectangular return sense line 12.

Figure 6A:
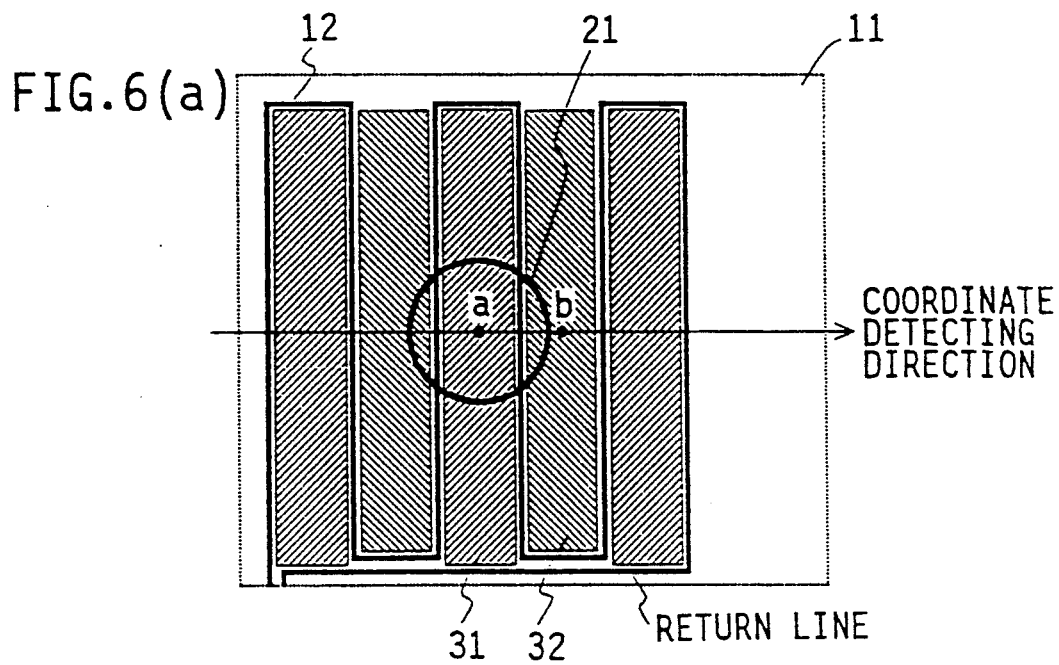
FIG. 6 is a diagram explaining correspondences between positions of a coil on a rectangular return sense line (FIG. 6(a)) and induced signals induced in first, second and third sense lines (FIGS. 6(b) through 6(d), respectively) in the second embodiment.

As shown in FIG. 6a, the reading surface of the tablet 11 is structured so that an area 31 in which a loop coil is formed by the first rectangular return sense line 12 and is return line and an area 32 in which no loop coil is formed appear alternately.

Figure 6B:
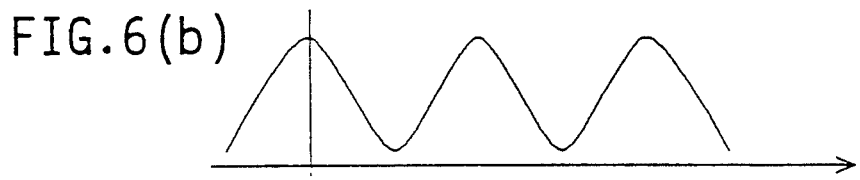

When the coil 21 is now placed in the middle of the area 31 in which the loop coil is formed, i.e. at point a in FIG. 6a, electromagnetic coupling between the coil 21 and the first rectangular return sense line 12 becomes the strongest and thereby an induced signal with the maximum amplitude is generated. The coupling becomes weaker as the coil 21 moves in the coordinate detecting direction and in the middle of the area 32, i.e. at point b in FIG. 6a, the amplitude becomes the minimum. Observation showed that the relationship between the positions of the coil 21 and the amplitudes of the induced signals turn out as shown in FIG. 6b.

Figure 6C:
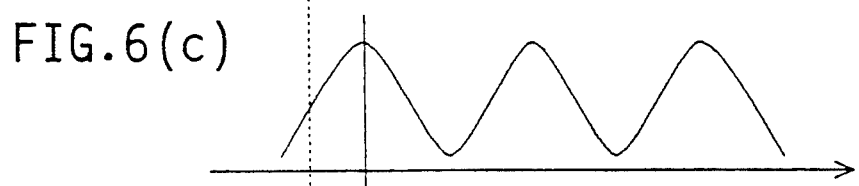
Figure 6D:
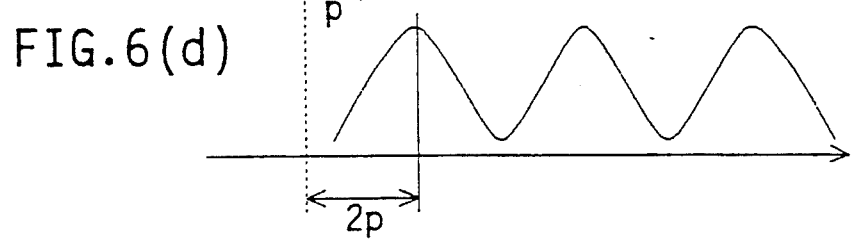

Since the second and third rectangular return sense lines are laid respectively having gaps of sense line pitches p and 2p from the first rectangular return sense line, the relationships between the positions of the coil 21 and the amplitudes of respective induced signals turn out as shown in FIGS. 6c and 6d.

Accordingly, the amplitudes of the induced signal induced in each sense line have information of the position where the coil 21 is placed. Utilizing this characteristic, the present coordinate reading system finds coordinate values from the amplitudes of the induced signals.

Figure 7:
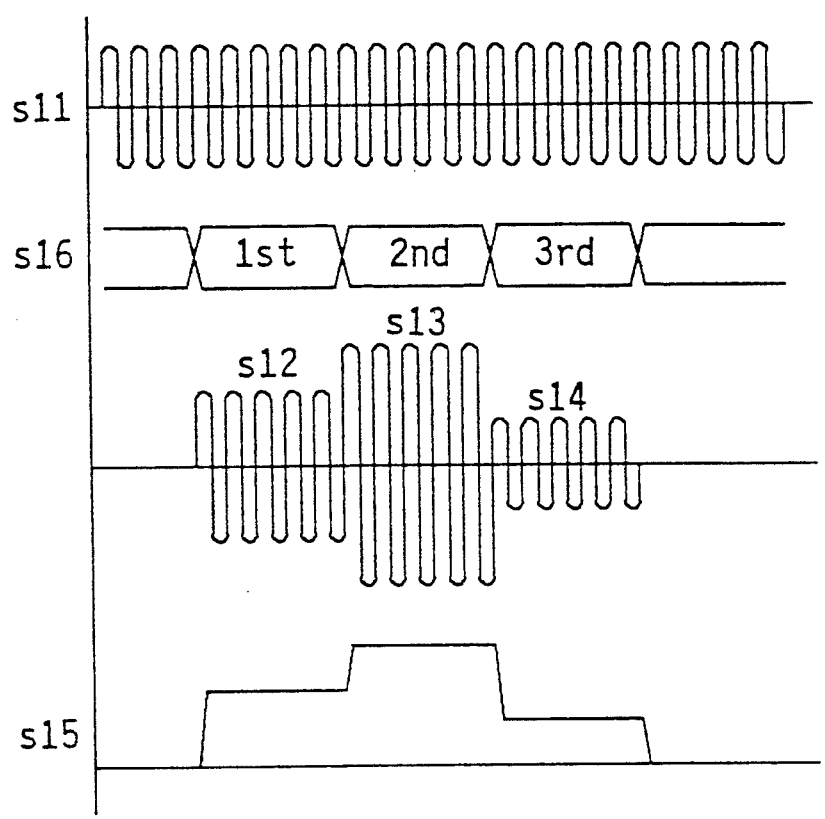
FIG. 7 is a timing chart for selecting the sense line in the second embodiment.

Referring now to a timing chart in FIG. 7, operations of the system will be explained.

The excitation signal generating circuit 19 always supplies excitation signals s11 to the coordinate indicator 20, so that the coil 21 always generates an AC magnetic field.

When the coordinate indicator 20 is placed on the tablet 11, an induced signal is induced in each sense line on the tablet 11 due to the AC magnetic field generated by the coil 21.

The control circuit 18 gives the selecting signals s16 to the selecting circuit 15 to sequentially select the three sense lines. As a result, induced signals s12, s13 and s14 induced in the selected sense lines are inputted sequentially to the signal processing circuit 16.

Normally the processing for selecting three sense lines are carried out in order from a neighboring one to a next neighboring one, though this scanning order is not essential and it is not always necessary to scan in such order.

Each induced signal is amplified, rectified and converted into the envelope signal s15 in the signal processing circuit 16. A coordinate is calculated from the envelope signal of the induced signal in the following manner.

The calculating circuit 17 inputs the envelope signal s15 from the signal processing circuit 16 each time the sense lines are sequentially selected. The input of the calculating circuit 17 is composed of the A/D converter as described before to input the magnitude of the envelope signal s15 as a digital value.

The calculating circuit 17 compares the magnitude of the envelope signals s15 sequentially inputted and detects roughly the area in which the coil 21 is placed.

FIG. 8 explains the relationship between the positions of the coil 21 and the magnitudes of each induced signal.

Figure 8A:
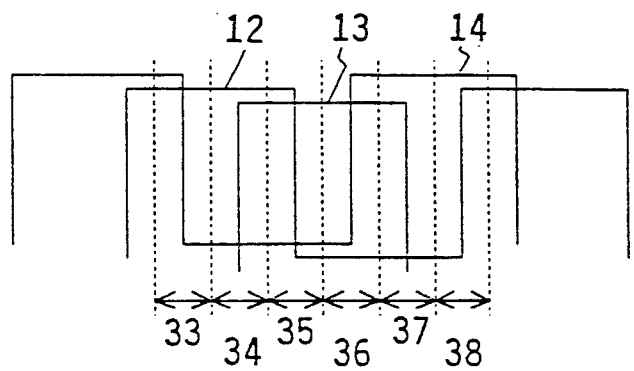
FIG. 8 is a diagram explaining correspondences between positions of the coil (FIG. 8(a)) and induced signals in local areas (FIGS. 8(b) and 8(c)) in the second embodiment.

A section, change of the tablet 11 shown in FIG. 8a may be divided into six areas 33, 34, 35, 36, 37 and 38 by the three sense lines. The whole area of the tablet is mere repetition of the pattern of this area. It will be understood that, for example, an area to the right side of the area 38 is equivalent to the area 33 from the position relationship of three sense lines. The relationship of the magnitudes of each sense line changes depending on which area the coil 21 is placed.

Figure 8B:
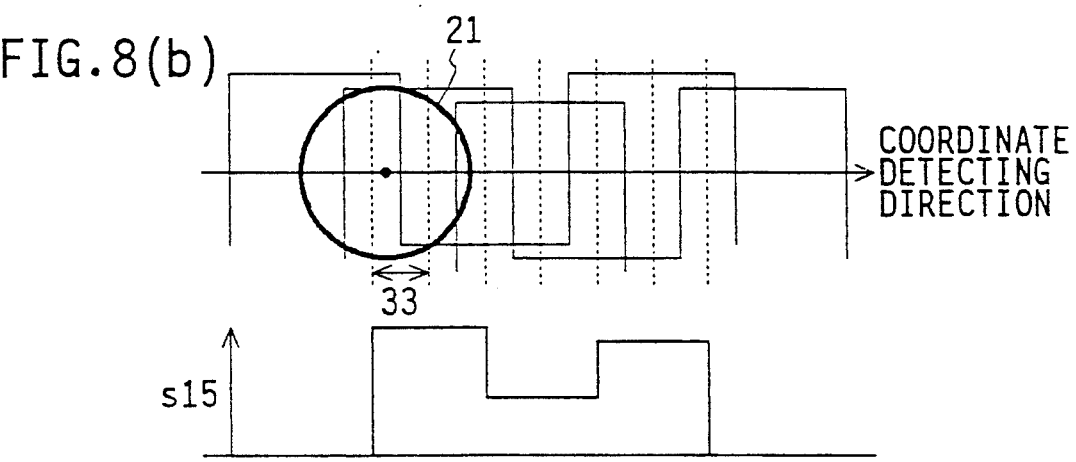

As described before, fluctuate the amplitude of the induced signal due to the relationship between the position of the coil 21 and the sense line turn out as shown in FIG. 6. From this relationship, when the coil 21 is placed, for example, in the area 33 as shown in FIG. 8b, the largest induced signal is generated in the first rectangular return sense line 12 and its amplitude becomes smaller in the third rectangular return sense line 14 and still smaller in the second rectangular return sense line 13. This relationship of the magnitudes is shown by the envelope signal s15 in FIG. 8b.

Figure 8C:
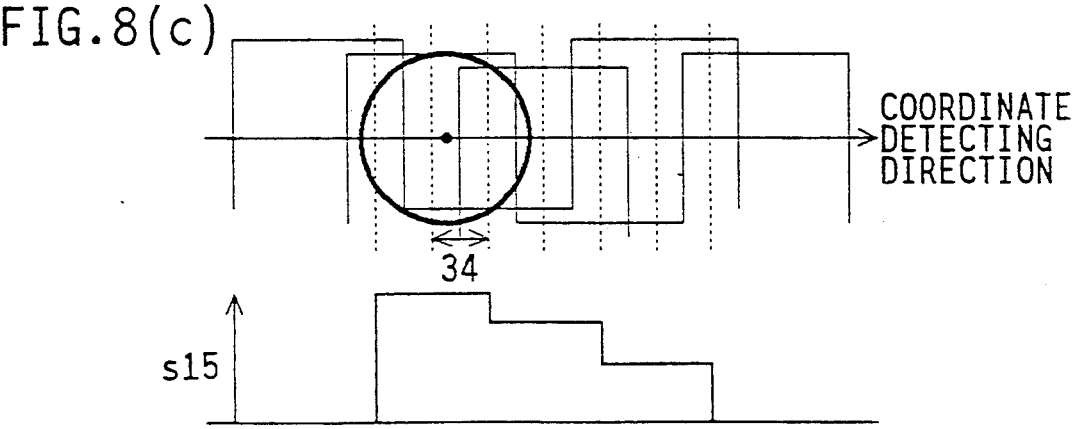

When the coil 21 is moved in the coordinate detecting direction and is placed in the area 34 as shown in FIG. 8(c), the magnitudes of the induced signals turn out in order from largest to smallest from the first rectangular return sense line 12 to the second rectangular return sense line 13 and finally to the third rectangular return sense line 14. Similarly, the relationships of the magnitudes of the induced signals in each area turn out as shown in the following table 1.

TABLE 1

Relationship of Magnitudes of Induced Signals For Each Coarse Area

| Area | Induced Signals | | |
|---|---|---|---|
| | Maximum | Medium | Minimum |
| 33 | first sense line | third sense line | second sense line |
| 34 | first sense line | second sense line | third sense line |
| 35 | second sense line | first sense line | third sense line |
| 36 | second sense line | third sense line | first sense line |
| 37 | third sense line | second sense line | first sense line |
| 38 | third sense line | first sense line | second sense line |

The position can be roughly detected by determining the relationship of the magnitudes of the induced signals as described above.

The fine position in each aforementioned area may be found as follows. At first, the three envelope signals are coded as follows:

Vp—amplitude voltage of the maximum signal (called a peak signal)
Vph—amplitude voltage of the middle signal
Vpl—amplitude voltage of the minimum signal.
Then from above, the following value of Q is found:

$$Q = (Vp - Vph)/(Vp - Vpl) \quad (2)$$

The value of Q has the following characteristics.

When the coil 21 is placed at the center of the second rectangular return sense line 13, i.e. at point c, as shown in FIG. 9a, the maximum induced signal is induced in the second rectangular return sense line 13 as shown in FIG. 9(b) and a peak signal Vp is inputted to the calculating circuit 17 when this sense line is selected.

When the first rectangular return sense line 12 is selected, an induced signal smaller than Vp is induced and Vp1 is inputted to the calculating circuit 17. When the third rectangular return sense line 14 is selected, similarly Vph is inputted to the calculating circuit 17. In the first rectangular return sense line 12 and the third rectangular return sense line 14, the effect of the electromagnetic coupling is equal and Vph=Vp1. Accordingly, from expression (2), Q=1.

When the coil 21 is moved in the coordinate detecting direction as shown in FIG. 10a, the coupling of the coil and the sense lines become smaller in the first rectangular return sense line 12 and the second rectangular return sense line 13 and in contrary to that, it becomes larger in the third rectangular return sense line 14, as shown in FIG. 10(b). As a result, Vp and Vp1 decrease and become smaller and Vph increases and becomes larger and Q in expression (2) takes a value smaller than 1.

Figure 11A:
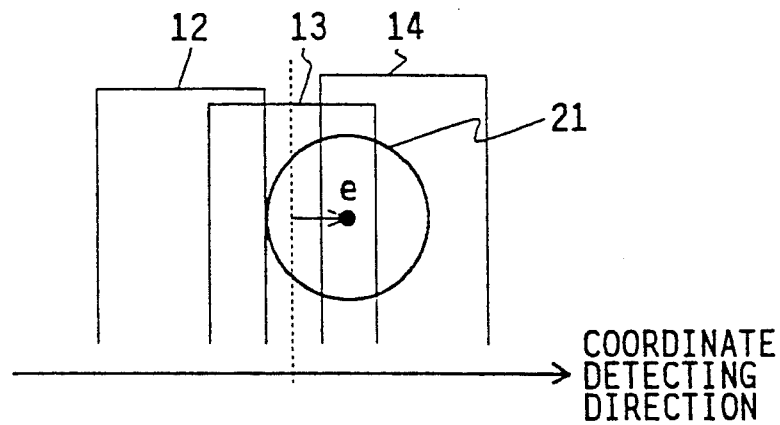
Figure 11B:
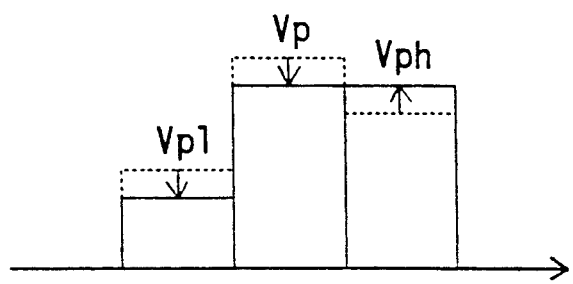

When the coil 21 further moves to a position in FIG. 11a, i.e. when it moves by a half of the sense line pitch p from the position in FIG. 9, the coupling of the coil and the sense lines becomes equal in the second rectangular return sense line 13 and the third rectangular return sense line 14, as shown in FIG. 11(b). That is, Vp=Vph and therefore, Q=0.

Q may be found in the same manner when the coil is moved to the left from the position in FIG. 9 and the tendency of Q increase and decrease of is the same at this time also.

Figure 12A:
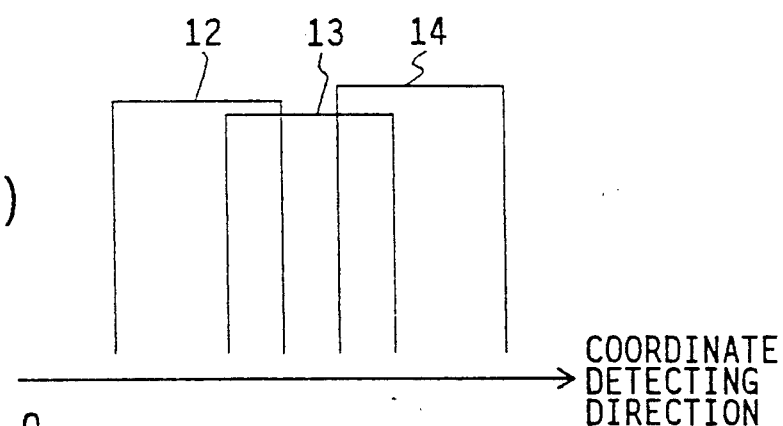
FIG. 12 is a diagram explaining the Q value (FIGS. 12(b)) in relation to the position of the coil (FIG. 12(a)) in the second embodiment.
Figure 12B:
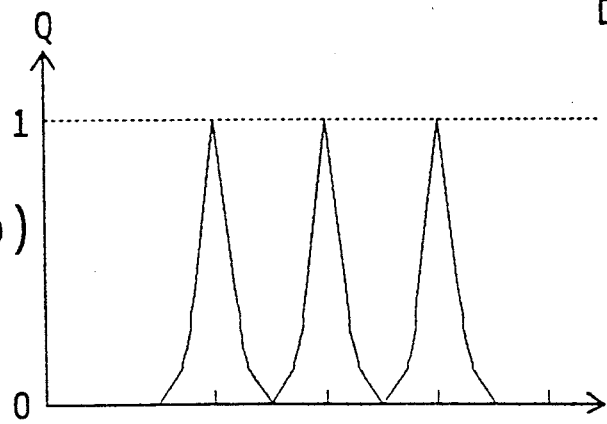

Q takes a value between 1 and 0 per ½ pitch of the sense line pitch p as shown in FIG. 12b and corresponds 1:1 to a fine position between sense lines as shown in FIG. 12(a). By finding out this characteristic of Q beforehand by experiments, a fine position between sense lines may be found by finding Q from induced signals.

The coarse position already found and the fine position found here allow coordinate values to be determined at a local area on the tablet by adjusting them.

Here the areas 33 through 38 shown in FIG. 8a are numbered from 0 to 5 respectively to indicate the coarse position by the number and the numbers of the coarse positions are denoted with a code 'Area'. Coordinate values may be then found from the following expressions (3) or (4):

$$\text{Coordinate value} = \text{Area} \times p + f(Q) \quad (3)$$

where Area=1, 3, 5, or $$\text{Coordinate value} = \text{Area} \times p - f(Q) \quad (4)$$

where Area=0, 2, 4

Here the codes may be described again as follows:
Area: coarse position
p: sense line pitch
f(Q): fine position between sense lines that corresponds to Q.

The coordinate values of the position where the coordinate indicator is placed at a local area on the tablet can be thus found.

However, as is apparent from the above explanations, though a position at a local area may be detected by this coordinate reading system, a position with respect to the whole area of the tablet cannot be detected. For example, if the coil has been placed in a certain area the last time the coordinate was calculated, the area where the movement of the coil is accurately found in the next calculation of the coordinate is when the coil moves within an area range of ±5 area positions centering on the area. When the coil moves more than that, distinction cannot be made from the case when a movement is within the area of ±5 area position.

However, a period for detecting coordinates is for example about 200 points per second, i.e. about 5 msec. per one point, and the range of the movement of the coordinate indicator during that time is limited. Accordingly, a relative coordinate reading system may be structured which calculates movements from the position previously detected per each coordinate detecting period and outputs it as a relative coordinate value. The present embodiment is fully practical as a pointing device in such an application that points to a display screen.

Brief description will be added now about a few other variations related to the present embodiment.

Although the aforementioned embodiment has been described about a one-dimensional coordinate reading system, a two-dimensional coordinate reading system may be readily structured when two sets of one-dimensional coordinate reading system thus structured are provided and orthogonally disposed to each other.

Figure 13:
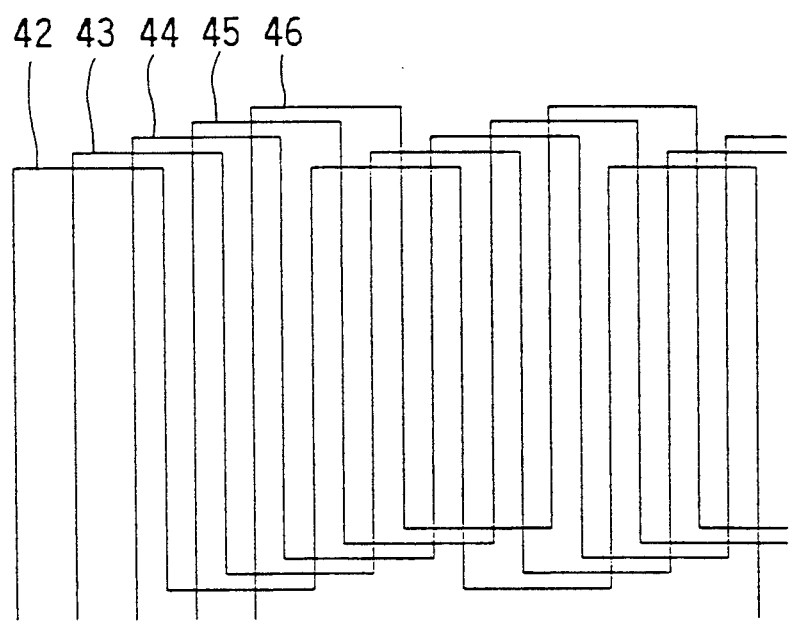
FIG. 13 is a diagram explaining another embodiment concerning laying third through fifth rectangular return sense lines in the second embodiment.

Moreover, though the tablet has been structured by three sense lines in the aforementioned embodiment, the tablet may be structured by any number of sense lines. FIG. 13 shows an embodiment where five sense lines are laid.

The present invention may be implemented so long as a coordinate reading system utilizes electromagnetic coupling between a tablet and a coordinate indicator, regardless of its coupling principle.

Figure 1:
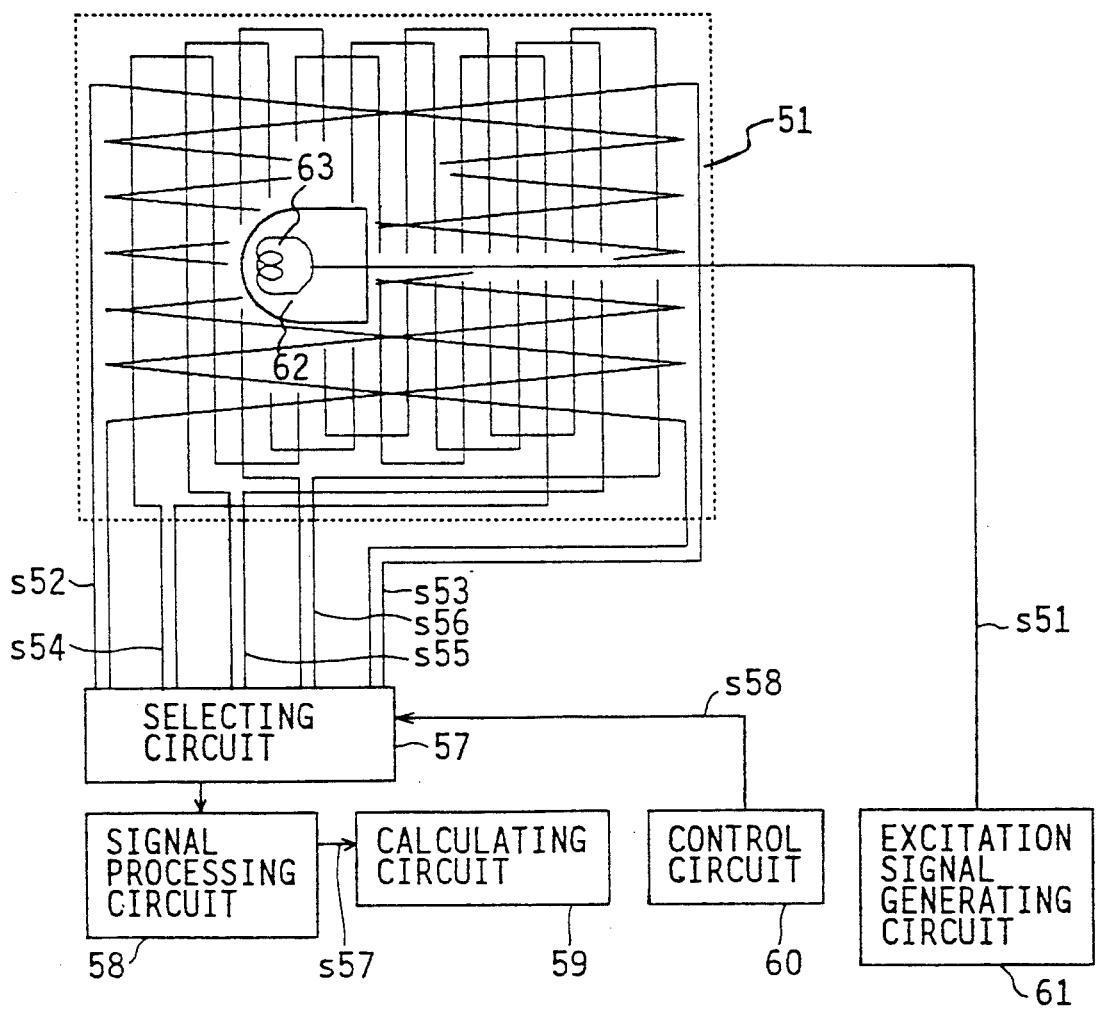
FIG. 1 is a diagram illustrating a structure of a third embodiment of a coordinate reading system according to the present invention.

Referring now to FIGS. 1 and 14 through 17, a third embodiment of the present invention will be explained. FIG. 1 is a diagram illustrating a structure of a coordinate reading system according to the third embodiment. To simplify its explanation, description will be made on a one-dimensional coordinate reading system.

In FIG. 1, a coordinate indicator 62, a coil 63, an excitation signal generating circuit 61 and a signal processing circuit 58 are disposed in the same manner as in the first and second embodiments.

A plurality of sense line groups are laid on a tablet 51. A structure of the sense line groups will be explained with reference to FIG. 14.

Figure 14A:
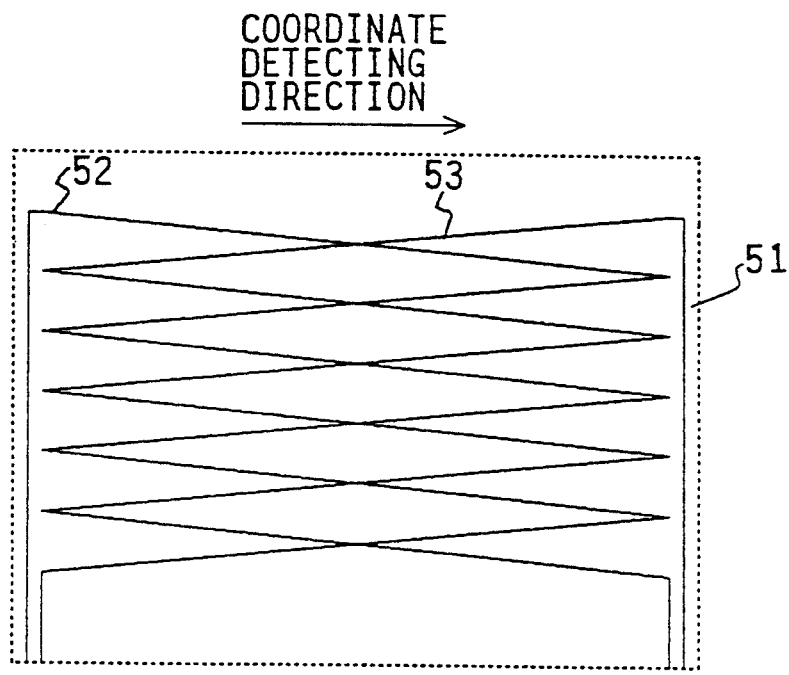
FIGS. 14 are diagrams explaining the laying of sense lines in the third embodiment, FIG. 14(a) illustrating the laying of zigzag sense lines and FIG. 14(b) illustrating the laying of rectangular return sense lines.

FIG. 14a shows a first zigzag sense line 52 and a second zigzag sense line 53. The first and second zigzag sense lines have similar constructions with the zigzag sense lines in the first embodiment.

These sense lines are used for finding a coarse position of the coordinate indicator 62 over the whole coordinate detecting range as described later. On these sense lines, induced signals s52 and s53 are induced respectively by an AC magnetic field generated by the coil 63 in the coordinate indicator 62.

Figure 14B:
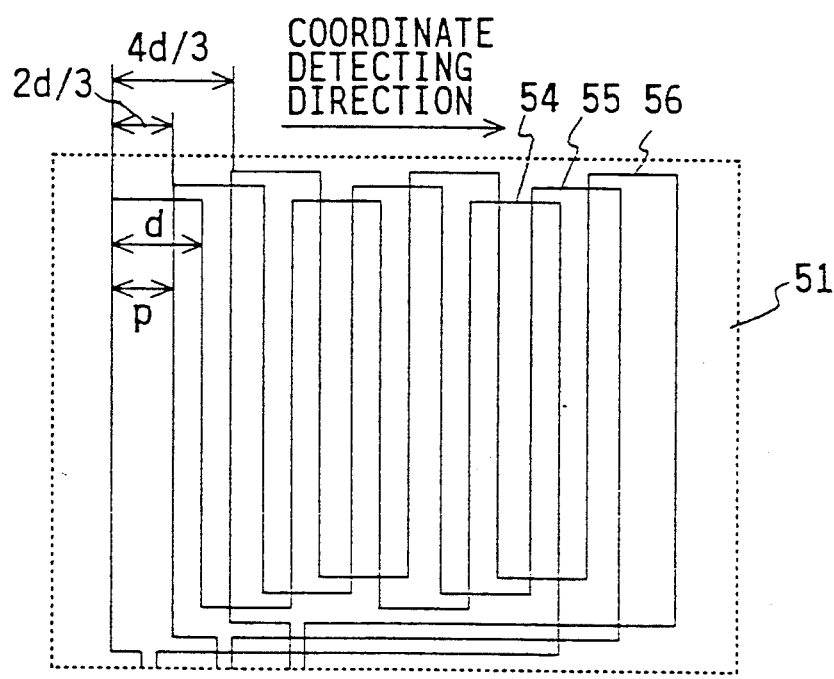

FIG. 14b shows rectangular return sense line groups. In this embodiment, three sense lines are laid as the rectangular return sense line groups. That is, they are a first rectangular return sense line 54, a second rectangular return sense line 55 and a third rectangular return sense line 56.

Each sense line has the same construction as the rectangular return sense lines in the second embodiment. In the figure, d indicates an interval between the conductor lines and p indicates a sense line pitch, and the relationship between them is as shown in the figure.

These sense lines are used for finding the fine position of the coordinate indicator 62 accurately, as described later. On those sense lines, induced signals s54, s55 and s56 are induced respectively by the AC magnetic field generated by the coil 63 in the coordinate indicator 62.

These sense line groups are connected to the selecting circuit 57. The selecting circuit 57 is composed of electronic switching elements such as analog switches and connects one of the sense lines among the first zigzag sense line 52 through the third rectangular return sense line 56 to the signal processing circuit 58.

The signal processing circuit 58 inputs the induced signals s52 through s56 induced in each sense line and generates their envelope signal s57.

Output of the signal processing circuit 58 is connected to the calculating circuit 59. The calculating circuit 59 inputs the envelope signal s57 of the induced signal and calculates coordinate values. An input section of the calculating circuit 59 for inputting the envelope signal s57 is composed of an A/D converter for reading a voltage value of the envelope signal s57 as a digital value.

The control circuit controls operations of the system and is connected to the selecting circuit 57 to supply selecting signals s58.

Next the operation of this system will be explained in reference to a timing chart in FIG. 15.

Since the excitation signal generating circuit 61 always supplies excitation signals s51 to the coordinate indicator 62, the coil 63 always generates an AC magnetic field. When the coordinate indicator 62 is placed on the tablet 51, an induced signal is induced on each sense line of the tablet 51 due to the AC magnetic field generated by the coil 63.

The control circuit 60 supplies the selecting signal s58 to the selecting circuit 57 to sequentially select the sense lines. As a result, the induced signals s52 through s56 induced on the selected sense lines are sequentially inputted to the signal processing circuit 58.

Figure 15:
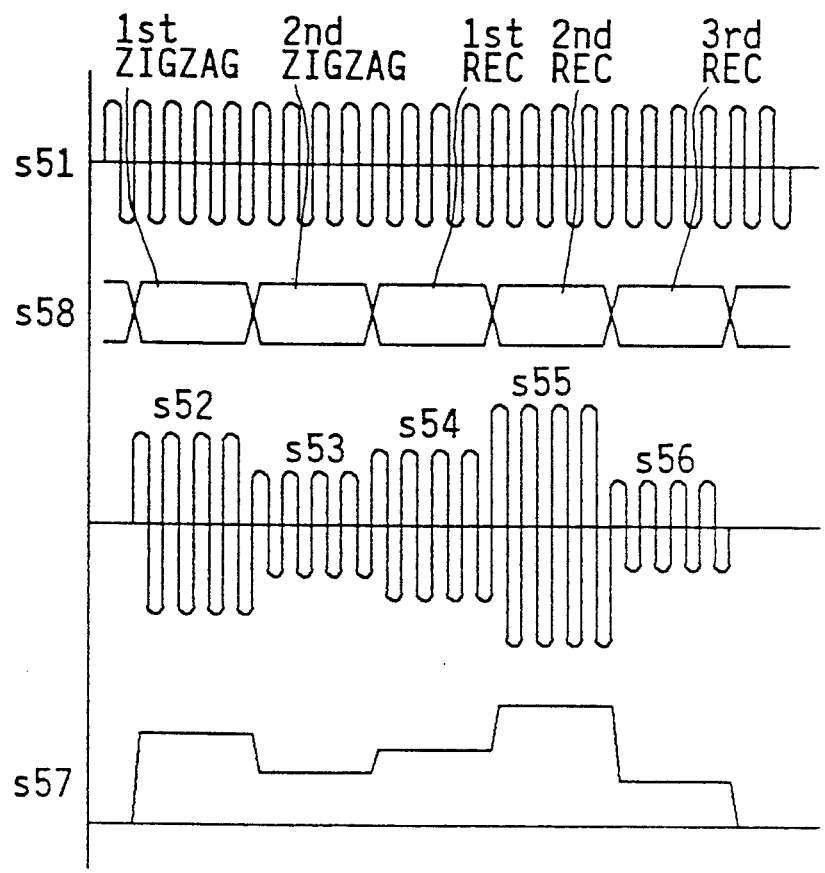
FIG. 15 is a timing chart for selecting sense lines in the third embodiment.

Although the processing for selecting the sense lines is carried out in sequential order from the first zigzag sense line 52 to the third rectangular return sense line 56 in the timing chart in FIG. 15, this selecting order is not essential and it is not always necessary to select in this order.

Each induced signal is amplified, rectified and converted into the envelope signal s57 in the signal processing circuit 58.

Next, description will be made of operations for calculating coordinates from the envelope signals of the induced signals. In this tablet, a coarse position over the whole coordinate detecting range and a fine position within a coarse position are separately found and from the results of them, a fine position in the whole coordinate detecting range is found.

The method for finding the coarse position over the whole coordinate detecting range is the same as that explained regarding the first embodiment. For the explanation below, an expression (5) for finding a value Q2 for calculating a coarse coordinate is given as follows:

$$Q2 = V2 - V1 \tag{5}$$

where,
  V1—amplitude voltage of the induced signal s52 of the first zigzag sense line 52, and
  V2—amplitude voltage of the induced signal s53 of the second zigzag sense line 53.

Figure 16:
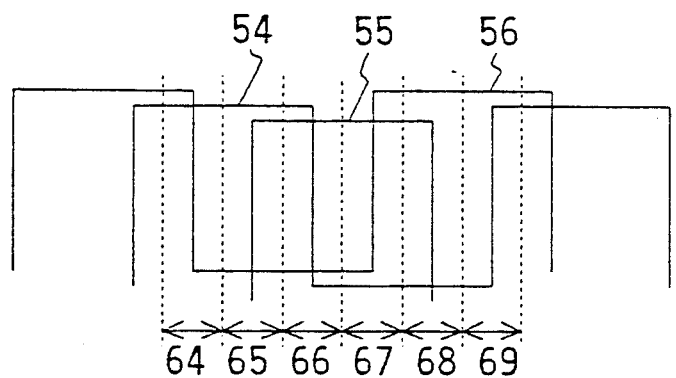
FIG. 16 is a diagram explaining coordinate calculating areas in the third embodiment.

The method for finding the fine position in the coarse position is the same as that explained regarding the second embodiment. Here the 'coarse position' means areas 64 through 69 which are divided by the first rectangular return sense line 54 through the third rectangular return sense line 56 as shown in FIG. 16. An expression (6) for finding a value Q for calculating the coordinate is given as follows:

$$Q = (Vp - Vph)/(Vp - Vp1) \quad (6)$$

where,
- Vp—Amplitude voltage of the maximum signal (called a peak signal)
- Vph—Amplitude voltage of the middle signal
- Vp1—Amplitude voltage of the minimum signal.

Next a method for specifying the position over the whole coordinate detecting range will be explained.

Figure 17:
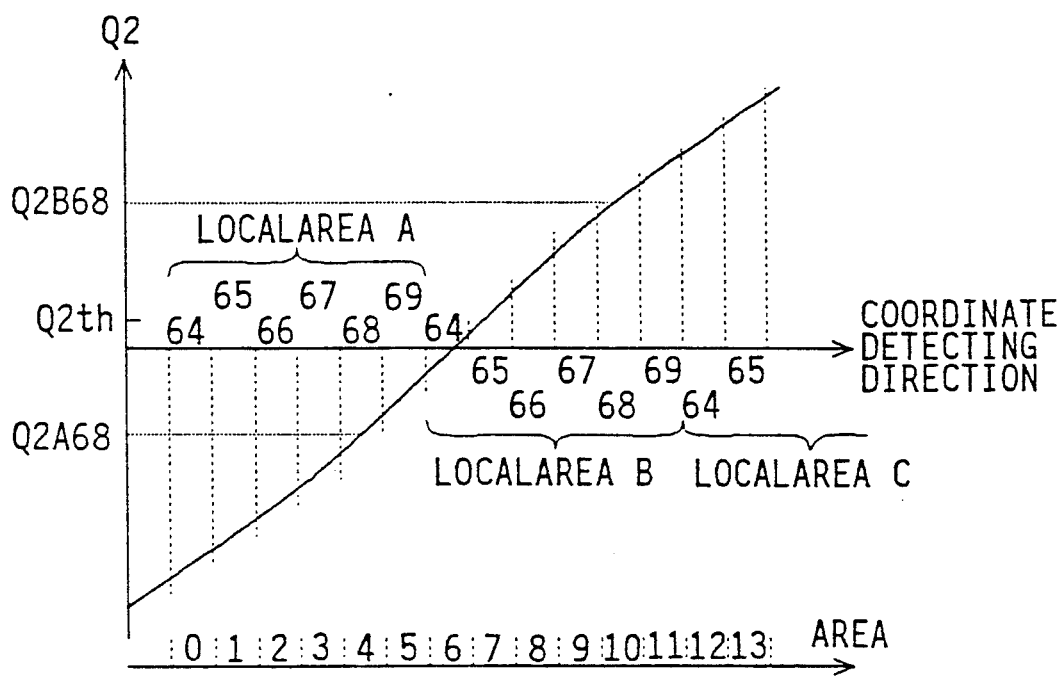
FIG. 17 is a diagram explaining a distribution of Q2 values on the whole tablet surface in the third embodiment.
Figure 18:
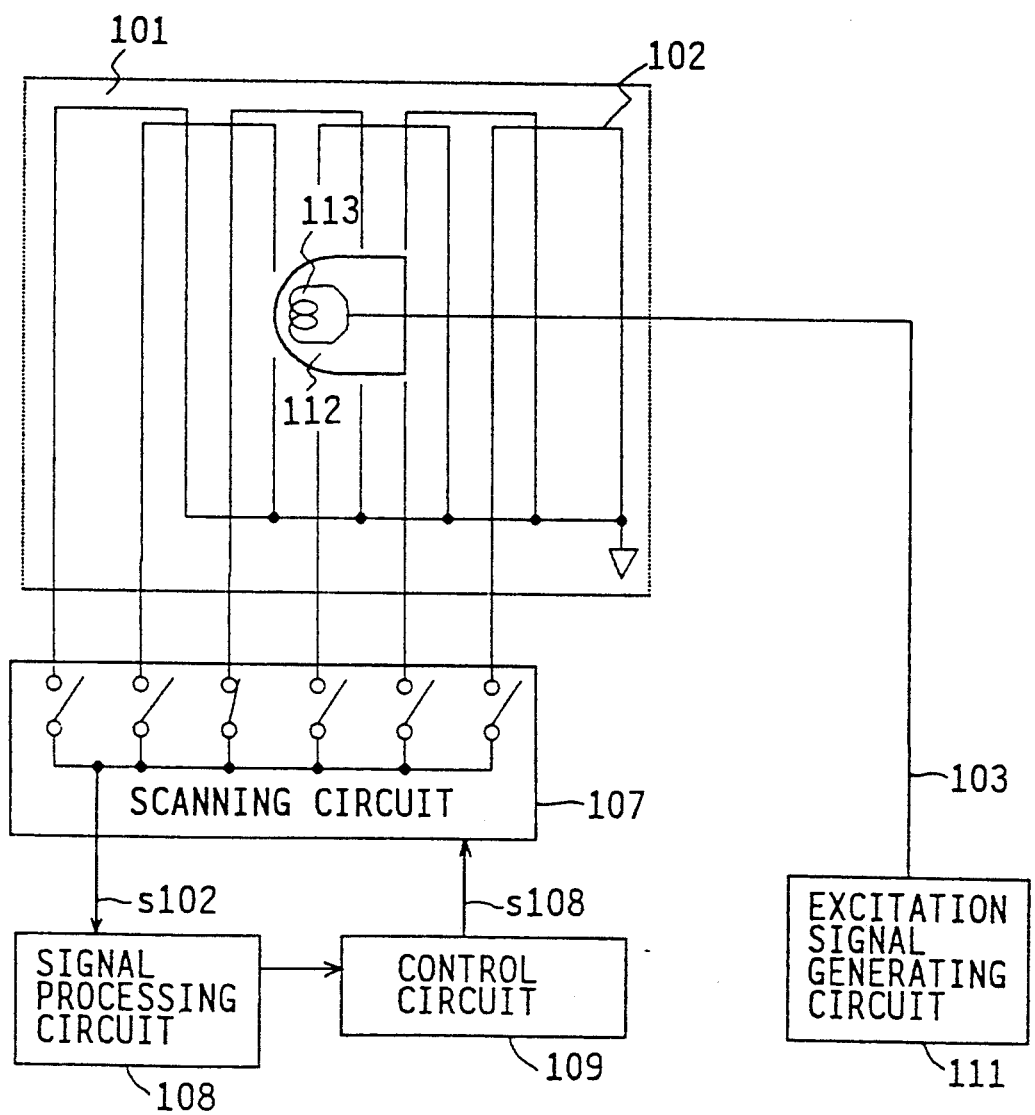
FIG. 18 is a diagram illustrating a prior art coordinate reading system.

FIG. 17 shows Q2 found as described above by a relationship with the coarse position and shows a tendency of Q2 around two local areas A and B tentatively defined. The abscissa indicates a coarse position in local areas shown in FIG. 16.

Now consider that the coil 63 is placed in the coarse position 68 in the local area B. At first the coil 63 is judged to be placed in the coarse position 68 by the method for finding the fine position within a coarse position. The position over the whole coordinate detecting range is not known yet at this stage. In FIG. 17, the coarse position 68 in the local area A and the coarse position 68 in the local area B are candidates of the position over the whole coordinate detecting range.

From these candidates, the position over the whole coordinate detecting range is specified by Q2. That is, Q2 must be found as a value around Q2 A68 if the coil 63 is placed in the local area A and as a value around Q2 B68 if it is placed in the local area B as shown in FIG. 17. Then by predetermining values in the middle of them, i.e. Qth in the figure, as threshold values and by comparing with these values, the position of the coil may be specified in which local area it is placed. The threshold values are defined similarly for all cases and are determined.

The reason why not to specify the position over the whole tablet surface only by the value of Q2 but rather to determine the position by combining with the coarse position in the local area is as follows. According to experiments conducted, Q2 did not strictly linearly correspond with the positions along the coordinate detecting direction and the coarse position 64 or 69 in the local area could not be directly specified. However, if the method as described above is adopted, only the coarse position 68 in the local area A and the coarse position 68 in the local area B, i.e. only the coarse position that appears in a certain interval, need be discriminated, so that they can be discriminated and specified by comparing Q2 with the threshold value.

The coarse position in the whole coordinate detecting range and the fine position within the coarse position can be thus found, so that from them, the fine position within the whole coordinate detecting area may be found.

Here the coarse position 64 through 69 shown in FIG. 17 are numbered from the origin over the whole coordinate detecting range. In the figure, the coarse position 64 in the local area A is 0 and the coarse positions are numbered in increasing order in the coordinate detecting direction. The numbers are denoted with a code of 'Cp'. Coordinate values may be then found by the following expressions (7) or (8):

$$\text{Coordinate value} = Cp \times p/2 + f(Q) \quad (7)$$

where Cp = 1, 3, 5, or $$\text{Coordinate value} = Cp \times p/2 - f(Q) \quad (8)$$

where Cp = 0, 2, 4

Here the codes may be described again as follows:
- Cp: coarse position
- p: sense line pitch
- f(Q): fine position between sense lines that corresponds to Q.

The fine coordinate values of the position where the coordinate indicator is placed over the whole coordinate detecting range can be thus found.

Although various modifications which have been described concerning the first and second embodiments may also be implemented in this embodiment, their detailed explanation is omitted here.

As described above, according to the present invention, the coordinate reading system is structured by providing several sense lines laid so that an electromagnetic coupling is generated with the coordinate indicator across the whole tablet surface and so that an amplitude of induced signals induced due to the electromagnetic coupling is changed depending on the position where the coordinate indicator is placed to calculate the position where the coordinate indicator is placed based on the induced signals induced in those sense line groups. Accordingly, many sense lines and many switching means for switching them need not be provided in a tablet as in the prior art coordinate reading system and the number of times for scanning them may be reduced, so that the structure of the coordinate reading system and of the tablet in particular may be simplified. Moreover, coordinates may be calculated with a higher speed.

What is claimed is:

1. A coordinate reading system, comprising:
    a tablet having a first zigzag sense line formed from a plurality of first sense lines connected in series in a direction perpendicular to a coordinate detecting direction, wherein the first sense lines are laid by gradually increasing their width along the coordinate detecting direction, and a second zigzag sense line formed from a plurality of second sense lines connected in series in the direction perpendicular to the coordinate detecting direction, wherein the second sense lines are laid by gradually decreasing their width along the coordinate detecting direction;
    a coordinate indicator;
    selecting means connected to said first and second zigzag sense lines for selecting either one of said first and second zigzag sense lines;
    signal processing means connected to said selecting means for outputting an amplitude signal of an induced signal induced in a selected zigzag sense line; and
    calculating means for calculating a position of said coordinate indicator based on induced signals induced in said first and second zigzag sense lines due to electromagnetic coupling between said first and second zigzag sense lines and said coordinate indicator.

2. A coordinate reading system, comprising:

a tablet having m rectangular return sense lines each composed of conductor lines laid in parallel with each other in an equal interval in a coordinate detecting direction and laid in the direction perpendicular to the coordinate detecting direction and returned and connected in a rectangular shape, the m rectangular return sense lines being laid with a gap of 2 n/m ($0 \leq n < m$) of said interval of said conductor lines;

a coordinate indicator for inducing a maximum amplitude signal, a second amplitude signal and a third amplitude signal in said rectangular return sense lines due to electromagnetic coupling between said rectangular return sense lines and said coordinate indicator; and calculating means for calculating a position of said coordinate indicator based on said induced signals.

3. The coordinate reading system according to claim 2, further comprising:

selecting means connected to said rectangular return sense lines for selecting any one of said rectangular return sense lines;

signal processing means connected to said selecting means for outputting an amplitude signal of an induced signal induced in said selected rectangular return sense line; and calculating means connected to said signal processing means for calculating a position of said coordinate indicator by inputting and calculating said amplitude signal.

4. The coordinate reading system according to claim 2, further comprising:

m signal processing circuits, one being connected to each of said rectangular return sense lines for outputting amplitude signals of induced signals induced in said rectangular return sense lines; and a calculating circuit connected to said m signal processing circuits for calculating a position of said coordinate indicator by inputting and calculating said amplitude signals.

5. A coordinate reading system, comprising:

a tablet in which a first sense line is laid by gradually increasing its width along the coordinate detecting direction, a second sense line is laid by gradually increasing its width along the opposite direction from that of said first sense line and each of m (m: odd number) rectangular return sense line groups which is a group of conductor lines laid in parallel with each other in an equal interval in the coordinate detecting direction are returned and connected in a rectangular shape is laid with a gap of 2 n/m ($0 \leq n < m$) of said interval of said conductor line group that comprises one rectangular return sense line; and a coordinate indicator, said coordinate reading system calculating a position of said coordinate indicator based on induced signals induced in said sense line groups due to electromagnetic couplings between said sense line groups and said coordinate indicator.

6. The coordinate reading system according to claim 5, comprising:

a selecting circuit connected to said first and second sense lines and rectangular return sense line groups for selecting either one of said sense line groups;

a signal processing circuit connected to said selecting circuit for outputting an amplitude signal of an induced signal induced in said selected sense line; and a calculating circuit connected to said signal processing circuit for calculating a position of said coordinate indicator by inputting and calculating said amplitude signal.

7. The coordinate reading system according to claim 5, comprising:

a plurality of signal processing circuits connected to each of said sense line group for outputting amplitude signals of induced signals induced in said selected sense line groups; and a calculating circuit connected to a plurality of said signal processing circuits for calculating a position of said coordinate indicator by inputting and calculating said amplitude signals.

8. The coordinate reading system according to claim 7, wherein a plurality of said first sense lines are connected in series in the direction perpendicular to the coordinate detecting direction to form a first zigzag sense line and a plurality of said second lines are similarly connected in series in the direction perpendicular to the coordinate detecting direction to form a second zigzag sense line to calculate a position of said coordinate indicator based on induced signals induced in said sense line groups due to electromagnetic couplings between said sense line groups and said coordinate indicator.

9. A coordinate reading system, comprising:

a tablet having a first zigzag sense line formed from a plurality of first sense lines connected in series in a direction perpendicular to a coordinate detecting direction, wherein the plurality of first sense lines are laid by gradually increasing their width along the coordinate detecting direction, and having a second zigzag sense line formed from a plurality of second sense lines connected in series in a direction perpendicular to the coordinate detecting direction, wherein the plurality of second sense lines are laid by gradually decreasing their width along the coordinate detecting direction, and having m rectangular return sense lines each composed of conductor lines laid in parallel with each other in an equal interval in the coordinate detecting direction and laid in the direction perpendicular to the coordinate detecting direction and returned and connected in a rectangular shape, the rectangular return sense lines being laid with a gap of 2 n/m ($0 \leq n < m$) of said interval of said conductor lines;

coordinate indicating means for inducing signals in said zigzag and rectangular return sense lines by electromagnetic coupling between the coordinate indicator means and the zigzag and rectangular return sense lines; and calculating means for calculating a position of said coordinate indicator means based on said induced signals, 10. The coordinate reading system according to claim 9; including selecting means connected to said first zigzag sense line, said second zigzag sense line and said rectangular return sense lines for selecting any one of said sense lines;

signal processing means connected to said selecting means for processing an induced signal induced in said selected sense line and providing an amplitude signal of said processed induced signal; and calculating means connected to said signal processing means for calculating a position of said coordinate indicator based on said amplitude signal provided from said signal processing means.

11. A coordinate reading system according to claim 10; wherein the selecting means and the signal processing means comprise first signal processing means connected to said first zigzag sense line for processing a first induced signal induced in said first zigzag sense line and providing an amplitude signal of said processed induced signal, and second signal processing means connected to said second zigzag sense line for processing a second induced signal induced in said second zigzag sense line and providing an amplitude signal of said processed second induced signal.

* * * * *